(12) United States Patent
Christmas et al.

(10) Patent No.: US 11,054,643 B2
(45) Date of Patent: *Jul. 6, 2021

(54) HOLOGRAPHIC IMAGE PROJECTION WITH HOLOGRAPHIC CORRECTION

(71) Applicant: Envisics Ltd, Knowlhill (GB)

(72) Inventors: Jamieson Christmas, Knowlhill (GB); Dackson Masiyano, Knowlhill (GB)

(73) Assignee: Envisics Ltd, Knowlhill (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,497

(22) Filed: Jan. 25, 2019

(65) Prior Publication Data
US 2019/0155030 A1  May 23, 2019

Related U.S. Application Data

(63) Continuation of application No. 15/683,443, filed on Aug. 22, 2017, now Pat. No. 10,228,559, which is a (Continued)

(30) Foreign Application Priority Data

Dec. 21, 2012 (GB) .................................... 1223416

(51) Int. Cl.
*G02B 27/01* (2006.01)
*G06T 11/60* (2006.01)
(Continued)

(52) U.S. Cl.
CPC ....... *G02B 27/0103* (2013.01); *G03H 1/0808* (2013.01); *G03H 1/0841* (2013.01); (Continued)

(58) Field of Classification Search
CPC ............ G02B 27/0068; G02B 27/0103; G02B 2027/0105; G02B 2027/0107; (Continued)

(56) References Cited

U.S. PATENT DOCUMENTS

| 4,275,454 A | 6/1981 | Klooster, Jr. |
| 6,043,937 A | 3/2000 | Hudson et al. |

(Continued)

FOREIGN PATENT DOCUMENTS

| GB | 2438026 | 11/2007 |
| GB | 2446852 | 8/2008 |

(Continued)

OTHER PUBLICATIONS

English machine translation of JP-08095481-A (Year: 1996).*
(Continued)

*Primary Examiner* — Nicholas R. Pasko
(74) *Attorney, Agent, or Firm* — McDonnell Boehnen Hulbert & Berghoff LLP

(57) ABSTRACT

There is provided a method of projection using an optical element (502,602) having spatially variant optical power. The method comprises combining Fourier domain data representative of a 2D image with Fourier domain data having a first lensing effect (604a) to produce first holographic data. Light is spatially modulated (504,603a) with the first holographic data to form a first spatially modulated light beam. The first spatially modulated light beam is redirected using the optical element (502,602) by illuminating a first region (607) of the optical element (602) with the first spatially modulated beam. The first lensing effect (604a) compensates for the optical power of the optical element in the first region (607). Advantageous embodiments relate to a head-up display for a vehicle using the vehicle windscreen (502,602) as an optical element to redirect light to the viewer (505,609).

19 Claims, 8 Drawing Sheets

Related U.S. Application Data continuation of application No. 14/654,275, filed as application No. PCT/GB2013/053403 on Dec. 20, 2013, now Pat. No. 9,766,456.

(51) Int. Cl.

| | |
|---|---|
| G06T 5/20 | (2006.01) |
| H04N 9/31 | (2006.01) |
| G03H 1/08 | (2006.01) |
| G03H 1/16 | (2006.01) |
| G03H 1/22 | (2006.01) |
| G03H 1/30 | (2006.01) |

(52) U.S. Cl.
 CPC ............ *G03H 1/16* (2013.01); *G03H 1/2205* (2013.01); *G03H 1/2294* (2013.01); *G06T 5/20* (2013.01); *G06T 11/60* (2013.01); *H04N 9/3185* (2013.01); *G02B 2027/011* (2013.01); *G02B 2027/013* (2013.01); *G02B 2027/0107* (2013.01); *G02B 2027/0109* (2013.01); *G03H 2001/085* (2013.01); *G03H 2001/0816* (2013.01); *G03H 2001/0825* (2013.01); *G03H 2001/0833* (2013.01); *G03H 2001/221* (2013.01); *G03H 2001/2218* (2013.01); *G03H 2001/2242* (2013.01); *G03H 2001/2271* (2013.01); *G03H 2001/2284* (2013.01); *G03H 2001/306* (2013.01); *G03H 2223/14* (2013.01); *G03H 2225/32* (2013.01); *G03H 2225/60* (2013.01); *G03H 2225/61* (2013.01); *G03H 2226/05* (2013.01); *G06T 2207/10016* (2013.01); *G06T 2207/10024* (2013.01)

(58) Field of Classification Search
 CPC ........ G02B 2027/011; G02B 2027/013; G03H 1/10; G03H 1/12; G03H 1/16; G03H 1/2205; G03H 1/2294; G03H 2001/2207; G03H 2001/221; G03H 2001/2213
 USPC .................................. 359/9, 13, 14, 629–633
 See application file for complete search history.

(56) References Cited

U.S. PATENT DOCUMENTS

| | | | |
|---|---|---|---|
| 7,227,611 B2 | 6/2007 | Hull et al. | |
| 8,072,488 B2 | 12/2011 | Cable et al. | |
| 8,085,453 B2 | 12/2011 | Christmas et al. | |
| 8,159,733 B2 | 4/2012 | Christmas et al. | |
| 8,294,749 B2 | 10/2012 | Cable | |
| 8,654,048 B2 | 2/2014 | Collings et al. | |
| 8,878,759 B2 | 11/2014 | Crossland et al. | |
| 9,766,456 B2 * | 9/2017 | Christmas | G03H 1/2205 |
| 10,228,559 B2 * | 3/2019 | Christmas | G03H 1/0841 |
| 2001/0050787 A1 | 12/2001 | Crossland et al. | |
| 2002/0060831 A1 | 5/2002 | Gerchberg | |
| 2004/0027626 A1 | 2/2004 | Yamauchi et al. | |
| 2004/0042161 A1 | 3/2004 | Cameron et al. | |
| 2005/0041271 A1 | 2/2005 | Tomoyoshi | |
| 2005/0052617 A1 | 3/2005 | Fujikawa et al. | |
| 2005/0134709 A1 | 6/2005 | Ishii et al. | |
| 2005/0157188 A1 | 7/2005 | Kubo | |
| 2007/0024999 A1 | 2/2007 | Crossland et al. | |
| 2008/0068852 A1 | 3/2008 | Goihl | |
| 2008/0106653 A1 | 5/2008 | Scott | |
| 2008/0192312 A1 | 8/2008 | Hendricks et al. | |
| 2008/0198372 A1 | 8/2008 | Shaoher | |
| 2009/0002787 A1 | 1/2009 | Cable et al. | |
| 2009/0128875 A1 | 5/2009 | Christmas et al. | |
| 2009/0243963 A1 | 10/2009 | Hotta et al. | |
| 2009/0257104 A1 | 10/2009 | Cable et al. | |
| 2010/0014134 A1 * | 1/2010 | Cable | G03H 1/2205 359/9 |
| 2010/0085276 A1 | 4/2010 | Cable | |
| 2010/0103246 A1 * | 4/2010 | Schwerdtner | G03H 1/2294 348/40 |
| 2010/0165429 A1 | 7/2010 | Buckley et al. | |
| 2010/0165430 A1 * | 7/2010 | Buschbeck | G03H 1/2205 359/9 |
| 2011/0002019 A1 | 1/2011 | Routley et al. | |
| 2011/0157667 A1 * | 6/2011 | Lacoste | G03H 1/2205 359/9 |
| 2012/0133937 A1 | 5/2012 | Heintzmann et al. | |
| 2012/0224062 A1 | 9/2012 | Lacoste | |
| 2013/0022222 A1 | 1/2013 | Zschau et al. | |
| 2013/0044138 A1 | 2/2013 | Koga | |
| 2013/0265622 A1 | 10/2013 | Christmas | |
| 2014/0253987 A1 | 9/2014 | Christmas | |
| 2015/0009695 A1 | 1/2015 | Christmas et al. | |
| 2015/0022526 A1 | 1/2015 | Christmas | |

FOREIGN PATENT DOCUMENTS

| | | | |
|---|---|---|---|
| GB | 2461294 | 12/2009 | |
| GB | 2509180 | 6/2014 | |
| GB | 2436676 | 10/2017 | |
| JP | H05278498 | 10/1993 | |
| JP | H06-027863 | 4/1994 | |
| JP | H07104646 | 4/1995 | |
| JP | 08095481 | 4/1996 | |
| JP | H0895481 | 4/1996 | |
| JP | H11-003128 | 6/1999 | |
| JP | 2001-018682 | 1/2001 | |
| JP | 003-515180 | 4/2003 | |
| JP | 2004-0168230 | 6/2004 | |
| JP | 2004-538519 | 12/2004 | |
| JP | 2005-181854 | 7/2005 | |
| JP | 2006 301020 | 11/2006 | |
| JP | 2007-523359 | 8/2007 | |
| JP | 2008-544307 | 12/2008 | |
| JP | 2009-536748 | 10/2009 | |
| JP | 2011-508911 | 3/2011 | |
| JP | 2013-524270 | 6/2013 | |
| WO | WO 01/35155 | 5/2001 | |
| WO | WO 03/014837 | 2/2003 | |
| WO | WO 2003/060612 | 7/2003 | |
| WO | WO 2005/059881 | 6/2005 | |
| WO | WO 2006/134404 | 12/2006 | |
| WO | WO 2007/131649 | 11/2007 | |
| WO | WO 2007/131650 | 11/2007 | |
| WO | WO 2009/087358 | 7/2009 | |
| WO | WO 2009/156752 | 12/2009 | |
| WO | WO 2012/007762 | 1/2012 | |
| WO | WO2012007762 | 1/2012 | |
| WO | WO-2012007762 A1 * | 1/2012 | G03H 1/26 |

OTHER PUBLICATIONS

Miao et al., "Phase Retrieval from the magnitude of the Fourier transforms of nonperiodic objects," J. Opt. Soc. Am., vol. 15, No. 6, pp. 1662-1669 (Jun. 1998).

Notification of Transmittal of the International Search Report and Written Opinion for PCT/GB2013/050274, titled: Lighting Device for Headlights With a Phase Modulator, dated May 7, 2013.

Great Britain Search Report for GB 1202123.4, dated Jun. 19, 2013.

Notification of Transmittal of International Search Report and the Written Opinion of the International Searching Authority for Int'l Appl. No. PCT/GB2011/051328, titled: 2D/3D Holographic Display System, dated Sep. 21, 2011.

Notification of Reason(s) for Refusal for Appln. No. 2014-537712, dated Mar. 17, 2015 (with English Abstract).

Notification of Reason(s) for Refusal for Appl. No. 2014-537712, dated Sep. 30, 2014 (with English Abstract).

Difato et al., "Spatial Light Modulators for Complex Spatiotemporal Illumination of Neuronal Networks," Neuromethods, 67: 61-81 (2012).

Ferri, "Visualization of 3D Information with Digital Holography Using Laser Printers," Computers & Graphics, 25:309-321 (2001).

(56) References Cited

OTHER PUBLICATIONS

Inoue et al.., "LCOS Spatial Light Modulator Controlled by 12-Bit Signals for Optical Phase-Only Modulation," Proceedings of SPIE, International Society for Optical Engineering, vol. 6487, pp. 64870Y-1 (2007).
Mias and Camon, "A Review of Active Optical Devices: II. Phase Modulation," Journal of Micromechanics and Microengineering, 18(8): 1-22 (2008).
Buckley et al., "Full Colour Holographic Laser Projector HUD," SID Vehicles and Photons 2008, 15th Annual Symposium on Vehicle Displays, pp. 1-5, Oct. 17, 2008.
Fukaya et al., "Improved Electro-Holographic Display Using Liquid Crystal Devices to Diminish the System Size," Proceedings of International Conference on High Technology: Image Science and Technology, Evolution and Promise, World Techno Fair in Chiba, pp. 35-363, Sep. 11, 1996.
Notification of Transmittal of the International Search Report and the Written Opinion of the International Searching Authority, PCT/GB2013/053403, dated Feb. 21, 2014.
Great Britain Search Report, GB 1223416.7, dated Jul. 30, 2013.
Copending U.S. Appl. No. 15/683,443, filed Aug. 22, 2017.

\* cited by examiner

HOLOGRAPHIC IMAGE PROJECTION WITH HOLOGRAPHIC CORRECTION

CROSS-REFERENCE TO RELATED APPLICATIONS

This application is a continuation of U.S. patent application Ser. No. 15/683,443, filed on Aug. 22, 2017, which is a continuation of U.S. patent application Ser. No. 14/654,275, filed on Jun. 19, 2015, each of which is hereby incorporated herein by reference in its entirety. U.S. patent application Ser. No. 14/654,275 was a U.S. national stage application of International Patent Application no. PCT/GB2013/053403 filed on Dec. 20, 2013, which claimed the benefit of United Kingdom Patent Application no. GB 1223416/7, filed on Dec. 21, 2012. The benefit of priority of the above-referenced applications is hereby claimed.

FIELD OF THE INVENTION

The present disclosure relates to the field of image projection. Embodiments disclosed herein generally relate to holographic image projection and a method for the same. More specifically, embodiments disclosed herein generally relate to a head-up display and a method of projecting holographic images using a windscreen.

BACKGROUND

Light scattered from an object contains both amplitude and phase information. This amplitude and phase information can be captured on, for example, a photosensitive plate by well-known interference techniques to form a holographic recording, or "hologram", comprising interference fringes. The "hologram" may be reconstructed by illuminating it with suitable light to form a holographic reconstruction, or replay image, representative of the original object.

It has been found that a holographic reconstruction of acceptable quality can be formed from a "hologram" containing only phase information related to the original object. Such holographic recordings may be referred to as phase-only holograms. Computer-generated holography may numerically simulate the interference process, using Fourier techniques for example, to produce a computer-generated phase-only hologram. A computer-generated phase-only hologram may be used to produce a holographic reconstruction representative of an object.

The term "hologram" therefore relates to the recording which contains information about the object and which can be used to form a reconstruction representative of the object. The hologram may contain information about the object in the frequency, or Fourier, domain.

It has been proposed to use holographic techniques in a two-dimensional image projection system. An advantage of projecting images using phase-only holograms is the ability to control many image attributes via the computation method—e.g. the aspect ratio, resolution, contrast and dynamic range of the projected image. A further advantage of phase-only holograms is that no optical energy is lost by way of amplitude modulation.

A computer-generated phase-only hologram may be "pixellated". That is, the phase-only hologram may be represented on an array of discrete phase elements. Each discrete element may be referred to as a "pixel". Each pixel may act as a light modulating element such as a phase modulating element. A computer-generated phase-only hologram may therefore be represented on an array of phase modulating elements such as a liquid crystal spatial light modulator (SLM). The SLM may be reflective meaning that modulated light is output from the SLM in reflection.

Each phase modulating element, or pixel, may vary in state to provide a controllable phase delay to light incident on that phase modulating element. An array of phase modulating elements, such as a Liquid Crystal On Silicon (LCOS) SLM, may therefore represent (or "display") a computationally-determined phase-delay distribution. If the light incident on the array of phase modulating elements is coherent, the light will be modulated with the holographic information, or hologram. The holographic information may be in the frequency, or Fourier, domain.

Alternatively, the phase-delay distribution may be recorded on a kinoform. The word "kinoform" may be used generically to refer to a phase-only holographic recording, or hologram.

The phase delay may be quantised. That is, each pixel may be set at one of a discrete number of phase levels.

The phase-delay distribution may be applied to an incident light wave (by illuminating the LCOS SLM, for example) and reconstructed. The position of the reconstruction in space may be controlled by using an optical Fourier transform lens, to form the holographic reconstruction, or "image", in the spatial domain. Alternatively, no Fourier transform lens may be needed if the reconstruction takes place in the far-field.

A computer-generated hologram may be calculated in a number of ways, including using algorithms such as Gerchberg-Saxton. The Gerchberg-Saxton algorithm may be used to derive phase information in the Fourier domain from amplitude information in the spatial domain (such as a 2D image). That is, phase information related to the object may be "retrieved" from intensity, or amplitude, only information in the spatial domain. Accordingly, a phase-only holographic representation of an object in the Fourier domain may be calculated.

The holographic reconstruction may be formed by illuminating the Fourier domain hologram and performing an optical Fourier transform, using a Fourier transform lens, for example, to form an image (holographic reconstruction) at a reply field such as on a screen.

FIG. 1 shows an example of using a reflective SLM, such as a LCOS-SLM, to produce a holographic reconstruction at a replay field location, in accordance with the present disclosure.

A light source (110), for example a laser or laser diode, is disposed to illuminate the SLM (140) via a collimating lens (111). The collimating lens causes a generally planar wavefront of light to become incident on the SLM. The direction of the wavefront is slightly off-normal (e.g. two or three degrees away from being truly orthogonal to the plane of the transparent layer). The arrangement is such that light from the light source is reflected off a mirrored rear surface of the SLM and interacts with a phase-modulating layer to form an exiting wavefront (112). The exiting wavefront (112) is applied to optics including a Fourier transform lens (120), having its focus at a screen (125).

The Fourier transform lens (120) receives a beam of phase-modulated light exiting from the SLM and performs a frequency-space transformation to produce a holographic reconstruction at the screen (125) in the spatial domain.

In this process, the light—in the case of an image projection system, the visible light—from the light source is distributed across the SLM (140), and across the phase modulating layer (i.e. the array of phase modulating elements). Light exiting the phase-modulating layer may be distributed across the replay field. Each pixel of the hologram contributes to the replay image as a whole. That is, there is not a one-to-one correlation between specific points on the replay image and specific phase-modulating elements.

The Gerchberg Saxton algorithm considers the phase retrieval problem when intensity cross-sections of a light beam, $I_A(x,y)$ and $I_B(x,y)$, in the planes A and B respectively, are known and $I_A(x,y)$ and $I_B(x,y)$ are related by a single Fourier transform. With the given intensity cross-sections, an approximation to the phase distribution in the planes A and B, $\Phi_A(x,y)$ and $\Phi_B(x,y)$ respectively, is found. The Gerchberg-Saxton algorithm finds solutions to this problem by following an iterative process.

The Gerchberg-Saxton algorithm iteratively applies spatial and spectral constraints while repeatedly transferring a data set (amplitude and phase), representative of $I_A(x,y)$ and $I_B(x,y)$, between the spatial domain and the Fourier (spectral) domain. The spatial and spectral constraints are $I_A(x,y)$ and $I_B(x,y)$ respectively. The constraints in either the spatial or spectral domain are imposed upon the amplitude of the data set. The corresponding phase information is retrieved through a series of iterations.

A holographic projector may be provided using such technology. Such projectors have found application in head-up displays for vehicles.

The use of head-up displays in automobiles is becoming increasing popular. Head-up displays are broken down in to two main categories, those which use a combiner (a free standing glass screen whose purpose is to reflect a virtual image in to the driver's line of sight) and those which utilise the vehicle's windscreen to achieve the same purpose.

FIG. 2 shows an example head-up display comprising a light source 206, a spatial light modulator 204 arranged to spatially modulate light from the light source with holographic data representative of an image for projection, a Fourier transform optic 205, a diffuser 203, a freeform mirror 201, a windscreen 202 and a viewing position 207. FIG. 2 shows a so-called "indirect view" system in which a real image of the holographic reconstruction is formed at a replay field on the diffuser 203. A holographic reconstruction is therefore projected on the diffuser 203 and may be viewed from viewing position 207 by focusing on the diffuser 203. The projected image is viewed via a first reflection off freeform mirror 201 and a second reflection off windscreen 202. The diffuser acts to increase the numerical aperture of the holographic system, fully illuminating the freeform mirrors thereby allowing the virtual image to be viewed by a driver, for example.

However, a problem with using a windscreen 202 as a so-called "combiner" is that the curvature of the windscreen applies lensing power to the virtual image being displayed. This problem is further complicated by the different windscreen curvatures 202 that exist from left to right & top to bottom. Normally this complex lensing function is corrected through the use of a carefully designed freeform mirror 201. However, these mirrors are extremely complex to design with minimal aberrations and are extremely costly to manufacture with the required precision.

The present disclosure aims to address these problems and provide an improved projector.

SUMMARY OF THE INVENTION

Aspects of an invention are defined in the appended independent claims.

There is provided an improved method of projection of a target image. In particular, there is provided a method of projection using an optical element having spatially varying optical power such as a vehicle windscreen. The optical power of the optical element is compensated by combining image-content data with data having a lensing effect. Advantageously, a system is provided which can adjustably compensate for the irregular optical component.

BRIEF DESCRIPTION OF THE DRAWINGS

Embodiments will now be described to the accompanying drawings in which.

In the drawings, like reference numerals referred to like parts.

DETAILED DESCRIPTION OF THE DRAWINGS

Holographically-generated 2D images are known to possess significant advantages over their conventionally-projected counterparts, especially in terms of definition and efficiency.

Modified algorithms based on Gerchberg-Saxton have been developed—see, for example, co-pending published PCT application WO 2007/131650 incorporated herein by reference.

Figure 1:
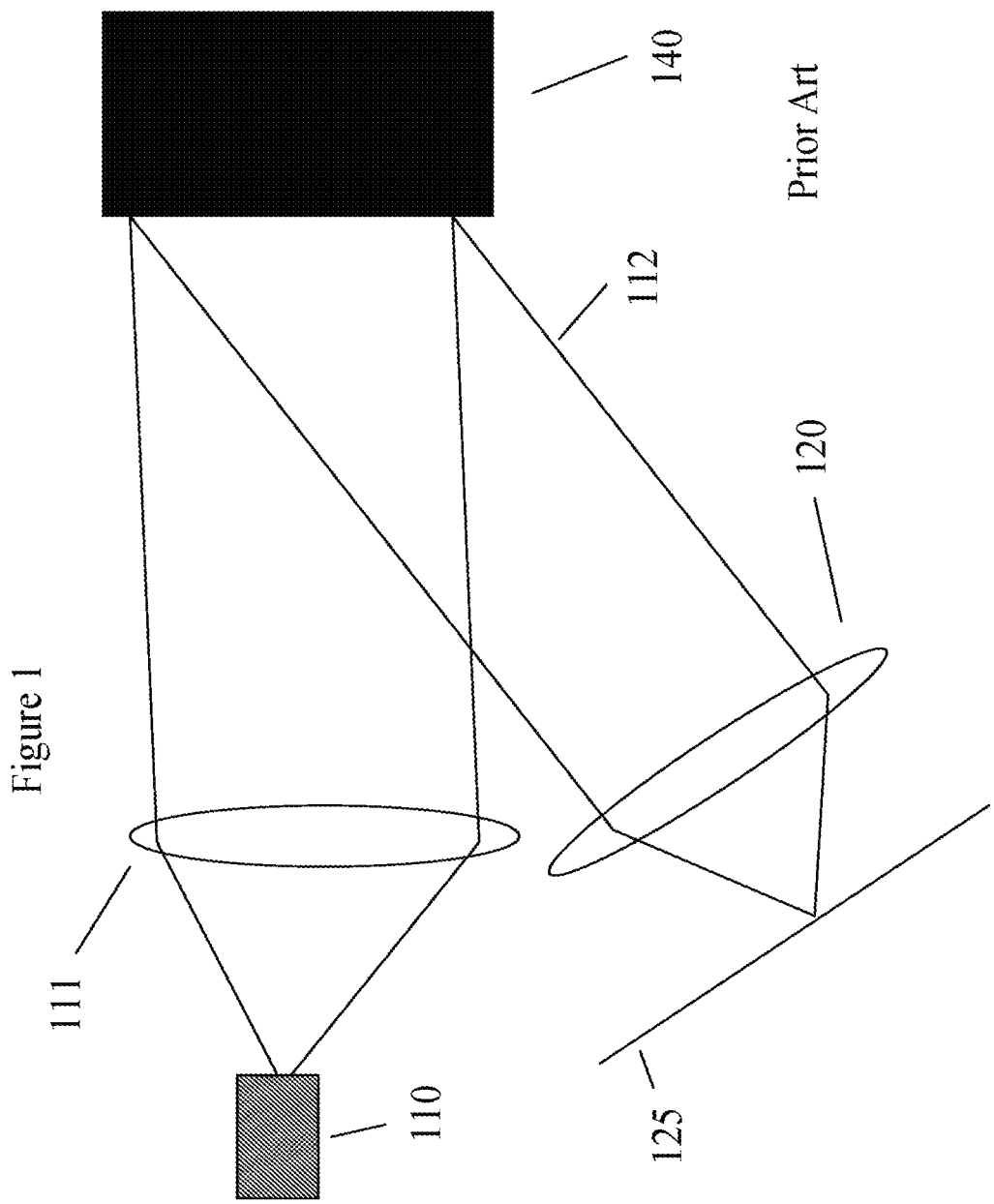
FIG. 1 is a schematic showing a reflective SLM, such as a LCOS, arranged to produce a holographic reconstruction at a replay field location.
Figure 2:
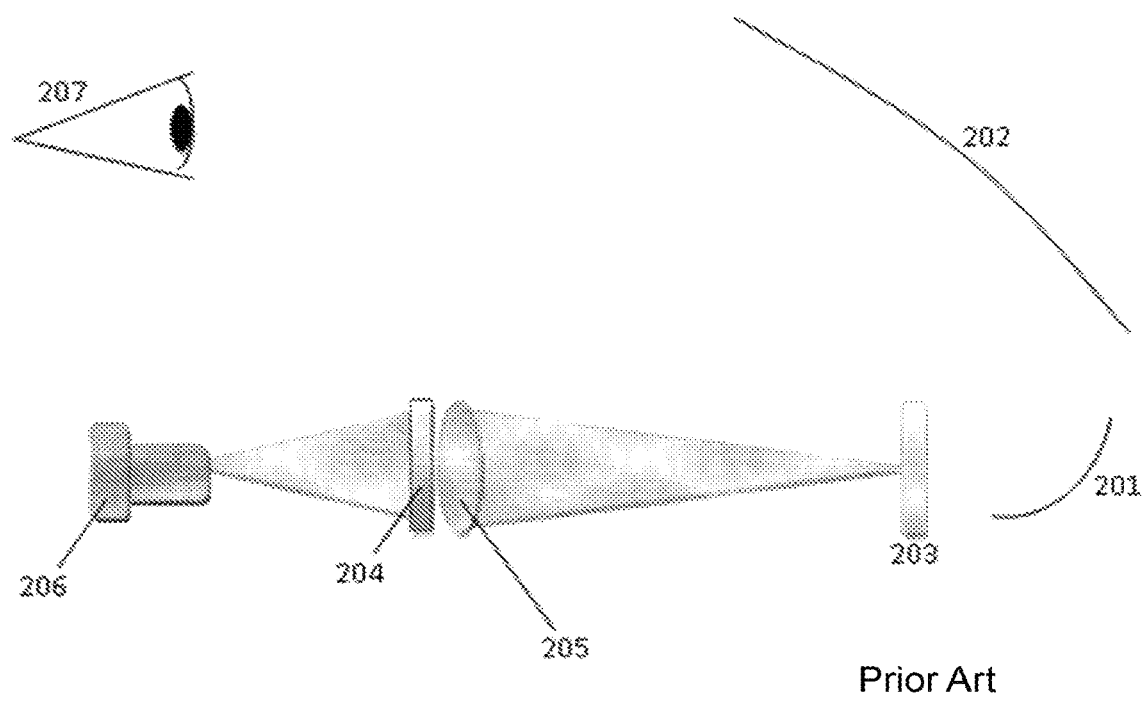
FIG. 2 shows a so-called "indirect view" holographic projector for a head-up display of a vehicle.
Figure 3:
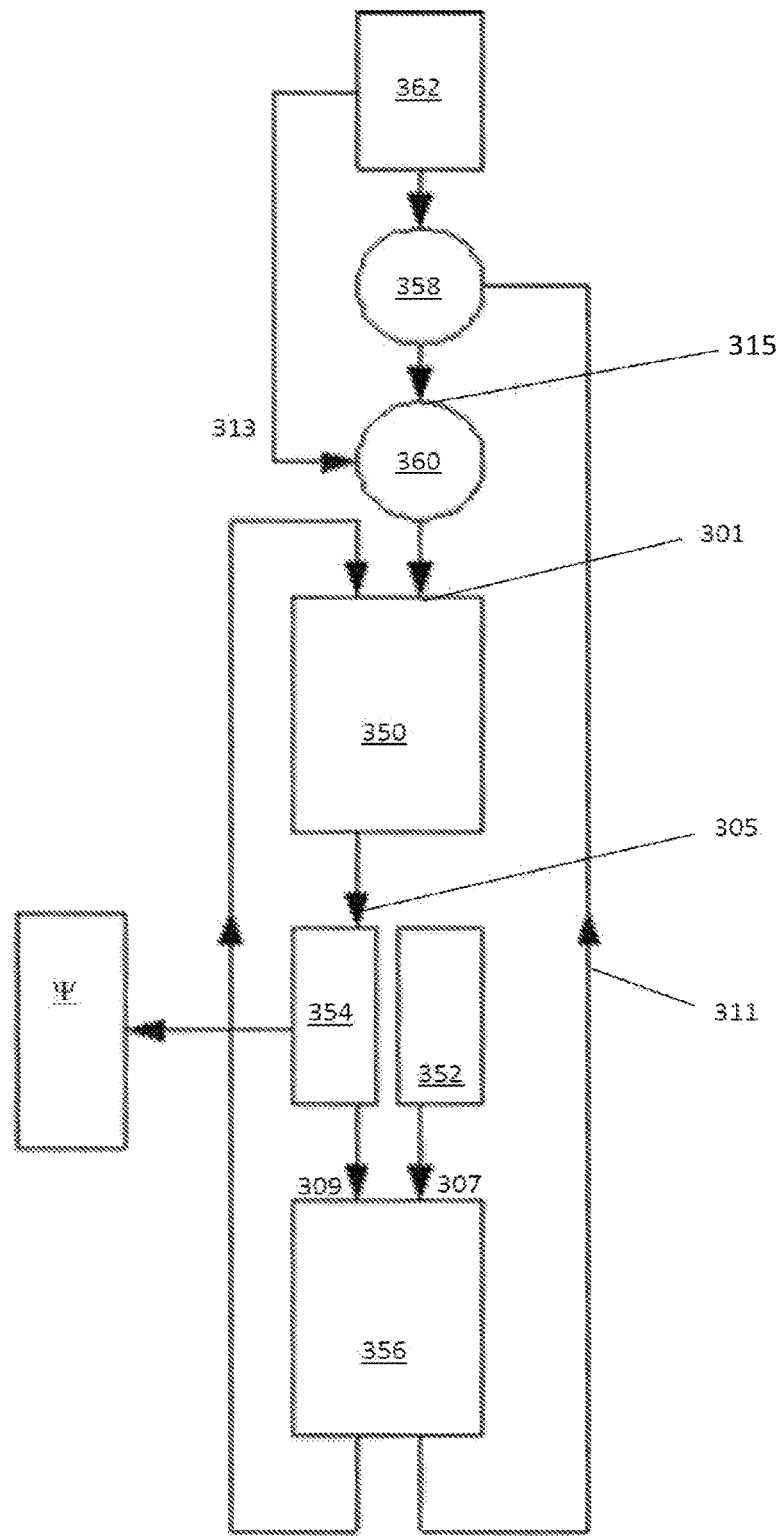
FIG. 3 shows an example algorithm for computer-generating a phase-only hologram.

FIG. 3 shows a modified algorithm which retrieves the phase information $\psi[u,v]$ of the Fourier transform of the data set which gives rise to a known amplitude information T[x,y] 362. Amplitude information T[x,y] 362 is representative of a target image (e.g. a photograph). The phase information $\psi[u,v]$ is used to produce a holographic representative of the target image at an image plane.

Since the magnitude and phase are intrinsically combined in the Fourier transform, the transformed magnitude (as well as phase) contains useful information about the accuracy of the calculated data set. Thus, the algorithm may provide feedback on both the amplitude and the phase information.

The algorithm shown in FIG. 3 can be considered as having a complex wave input (having amplitude information 301 and phase information 303) and a complex wave output (also having amplitude information 311 and phase information 313). For the purpose of this description, the amplitude and phase information are considered separately although they are intrinsically combined to form a data set. It should be remembered that both the amplitude and phase information are themselves functions of the spatial coordinates (x,y) for the farfield image and (u,v) for the hologram, both can be considered amplitude and phase distributions.

Referring to FIG. 3, processing block 350 produces a Fourier transform from a first data set having magnitude information 301 and phase information 303. The result is a second data set, having magnitude information and phase information $\psi_n[u,v]$ 305. The amplitude information from processing block 350 is set to a distribution representative of the light source but the phase information $\psi_n[u,v]$ 305 is retained. Phase information 305 is quantised by processing block 354 and output as phase information $\psi[u,v]$ 309. Phase information 309 is passed to processing block 356 and combined with the new magnitude by processing block 352. The third data set 307, 309 is applied to processing block 356 which performs an inverse Fourier transform. This produces a fourth data set $R_n[x,y]$ in the spatial domain having amplitude information 311 and phase information 313.

Starting with the fourth data set, its phase information 313 forms the phase information of a fifth data set, applied as the first data set of the next iteration 303'. Its amplitude information $R_n[x,y]$ 311 is modified by subtraction from amplitude information $T[x,y]$ 362 from the target image to produce an amplitude information 315 set. Scaled amplitude information 315 (scaled by $\alpha$) is subtracted from target amplitude information $T[x,y]$ 362 to produce input amplitude information $\eta[x,y]$ 301 of the fifth data set for application as first data set to the next iteration. This is expressed mathematically in the following equations:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

Where:
F' is the inverse Fourier transform.
F if the forward Fourier transform.
R is the replay field.
T is the target image.
$\angle$ is the angular information.
$\Psi$ is the quantized version of the angular information.
$\varepsilon$ is the new target magnitude, $\varepsilon \geq 0$
$\alpha$ is a gain element ~1

The gain element $\alpha$ may be predetermined based on the size and rate of the incoming target image data.

Figure 4:
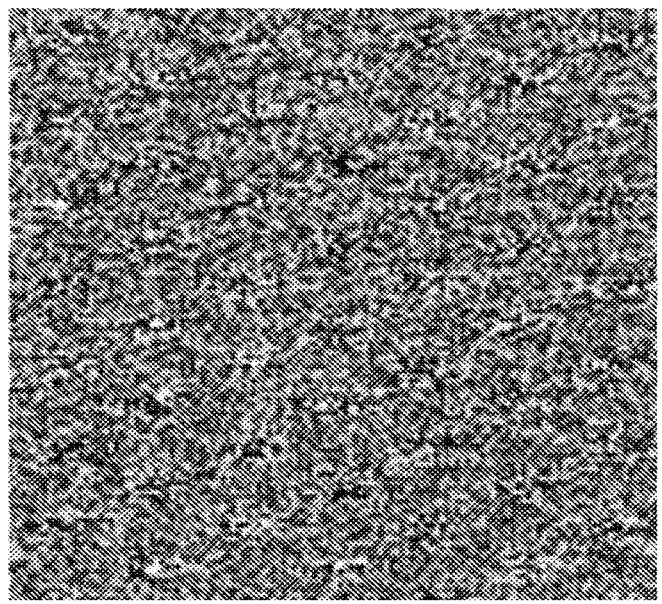
FIG. 4 shows an example random phase seed for the example algorithm of FIG. 3.

In the absence of phase information from the preceding iteration, the first iteration of the algorithm uses a random phase generator to supply random phase information as a starting point. FIG. 4 shows an example random phase seed.

In a modification, the resultant amplitude information from processing block 350 is not discarded. The target amplitude information 362 is subtracted from amplitude information to produce a new amplitude information. A multiple of amplitude information is subtracted from amplitude information 362 to produce the input amplitude information for processing block 356. Further alternatively, the phase is not fed back in full and only a portion proportion to its change over the last two iterations is fed back.

Accordingly, Fourier domain data representative of an image of interest may be formed. Embodiments relate to phase-holograms by way of example only and it may be appreciated that the present disclosure is equally applicable to amplitude holograms.

In summary, the inventors have recognised that problems caused by using a combiner having a spatially-varying optical power, such as a vehicle windscreen, may be addressed by using a so-called "direct view" system, instead of an "indirect view" system, and combining the Fourier domain data representative of the image with Fourier domain data having a lensing effect which compensates for the optical power added by the combiner. The data may be combined by simple addition. In this respect, the hologram comprises first data representative of the actual image for projection and second data comprising a lensing function. In particular, this approach allows for real-time adjustment of the compensation if, for example, the projection system is realigned during use and a different region of the combiner is used. Such realignment may be required if a viewer moves, for example.

Figure 5:
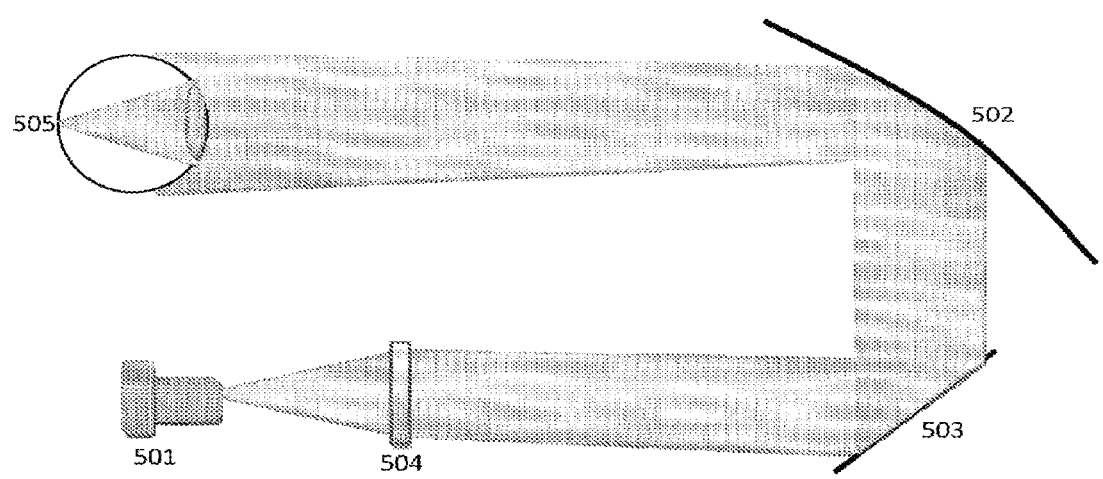
FIG. 5 shows one channel of a "direct view" head-up display for a vehicle.

FIG. 5 shows a so-called "direct view" system for a head-up display comprising a light source 501, a SLM 504, a freeform mirror 503, a windscreen 502 and a viewing position 505. Notably, the lens in viewer's eye performs the necessary Fourier Transform. A direct view system does not therefore comprise a Fourier lens. If the rays from the SLM are collimated then the eye will need to focus at infinity for a sharp image to form on the retina. However, if a Fourier domain data comprising a lensing effect is added to the Fourier domain data representative of the image, the light rays will cease to be collimated and the eye will need to focus at the focal length defined by the lensing effect for a sharp replay field to be formed on the retina.

In an embodiment, Fourier domain data having a lensing effect is combined—for example, added—to the Fourier domain data represented of the image for projection to compensate, or even negate, the impact of the optical power of the windscreen. The skilled person knows how to calculate Fourier domain data having a required lensing effect and how to add such data to other Fourier domain data.

There is therefore provided a method of projection using an optical element having spatially variant optical power, the method comprising: combining Fourier domain data representative of a 2D image with Fourier domain data having a first lensing effect to produce first holographic data; spatially modulating light with the first holographic data to form a first spatially modulated light beam; redirecting the first spatially modulated light beam using the optical element by illuminating a first region of the optical element with the first spatially modulated beam; wherein the first lensing effect compensates for the optical power of the optical element in the first region.

Given that the SLM may have a low numerical aperture, the holographic reconstruction will only be visible to one eye. Therefore, in a further advantageous embodiment, two SLMs are used to provide two holographic projections. See FIG. 6. As each eye 609 will view a different projection, each projection reflects off of a different area, or region, of the windscreen 606 and 607. Each area is likely to have a different optical power and this can therefore be corrected, or compensated for, individually. Notably, the inventors have recognised that the different projections are affected differently by the windscreen and each projection may be corrected independently in accordance with the present disclosure.

Figure 6:
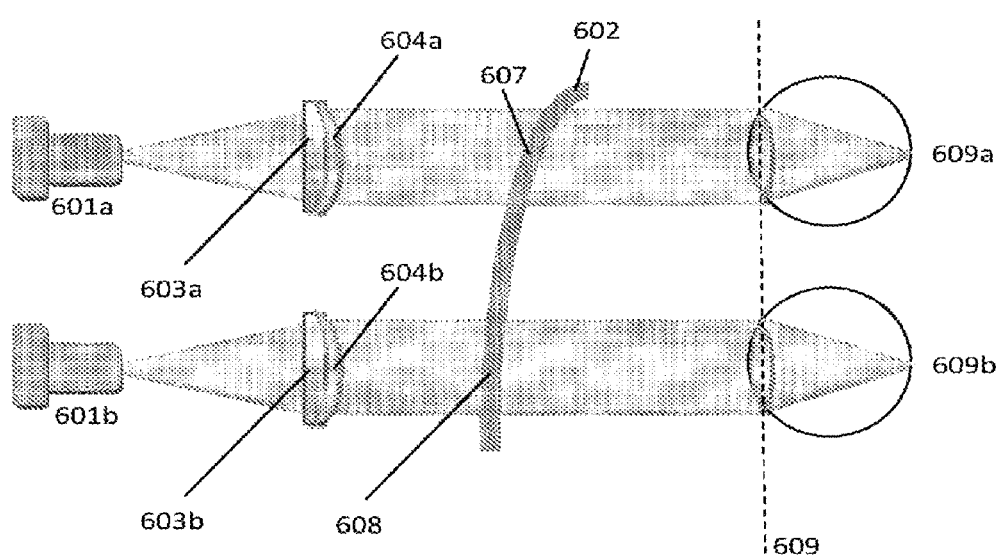
FIG. 6 show a "direct view" for a head-up display of a vehicle in accordance with embodiments.

In more detail, FIG. 6 shows a first light source 601a illuminating a first array of spatially-modulating pixels 603a. A first hologram is represented on the pixels 603a. The first hologram comprises image data and first lensing data 604a. The image data is data representative of a 2D image for projection. The first lensing data 604a is data providing a first lensing effect. The spatially modulated light is incident upon a first region 607 of a windscreen 602. The light is redirected by the windscreen 602 to a first region 609a of a viewing plane 609. A corresponding optical path is provided for a second hologram. A second light source 601b illuminates a second array of spatially-modulating pixels 603b. A second hologram is represented on the pixels 603b.

The second hologram comprises the image data and second lensing data 604b. The image data is the data representative of the 2D image for projection. The second lensing data 604b is data providing a second lensing effect. In an embodiment, the first lensing data 604a is different to the second lensing data 604b. The spatially modulated light is incident upon a second region 608 of the windscreen 602. The light is redirected by the windscreen 602 to a second region 609b of the viewing plane 609. In an embodiment, the first region 609a and second region 609b of the viewing plane are substantially adjacent and/or do not overlap.

There is therefore provided a method of projection using an optical element having spatially variant optical power, the method comprising: combining Fourier domain data representative of a 2D image with Fourier domain data having a first lensing effect to produce first holographic data; combining the Fourier domain data representative of the 2D image with Fourier domain data having a second lensing effect to produce second holographic data; spatially modulating light with the first holographic data to form a first spatially modulated light beam and spatially modulating light with the second holographic data to form a second spatially modulated light beam; redirecting the first and second spatially modulated light beams using the optical element by illuminating a first region of the optical element with the first spatially modulated beam and illuminating a second region of the optical element with the second spatially modulated beam; wherein the first and second lensing effects compensate for the optical power of the optical element in the first and second regions, respectively.

In an embodiment, the first lensing effect is different to the second lensing effect and/or the first and second lensing effects are independently selected or calculated. It can be understood that in this respect, different optical powers of the first and second regions of the optical element may be individually compensated. It may be considered that the first and second holograms are independently-configured to compensation for the spatially-varying and complex optical power of the optical element.

Notably, this approach avoids the need for an expensive freeform mirror by compensating for the complex optical power of the windscreen using individually-compensated holograms. Further advantageously, it can be understood that the system may be readily adjusted to compensate for different viewing angles or different windscreen shapes, for example. It can further be appreciated that if the windscreen curvature is profiled, the system may dynamically respond to changes by selecting different lensing data. In embodiments, there is therefore provided a head-up display which can be used in any vehicle without physical modification.

It can be understood that, in an embodiment, the first and second lensing effects substantially negate the optical power of the optical element in the first and second regions, respectively.

In embodiments, the hologram is a phase-only hologram and the lensing effect is provided by a phase-only lens. The phase-only hologram may be calculated in real-time or retrieved from a repository such as a database. The hologram may be calculated using a Gerchberg-Saxton type algorithm or any other algorithm for generating a Fourier domain hologram. The skilled person will understand that the hologram may equally be an amplitude hologram, or an amplitude and phase hologram, and the lensing effect may therefore be provided by amplitude hologram, or amplitude and phase hologram.

Optionally, because of the low numerical aperture of some SLMs, embodiments include an eye tracking mechanism to ensure the driver is able to see the holograms at all times (in the so called eye-box area). In these embodiments, a moving mirror or other light steering mechanism, coupled with the eye tracking system, is used. In an embodiment, the optical element is arranged to redirect the first and second spatially modulated light beams to a viewing plane.

In a preferred system, each eye receives only one spatially modulated beam. The preferred separation of the beams at the viewing plane is dependent on the separation of eyes. In an embodiment, the first and second spatially modulated light beams are substantially adjacent at the viewing plane. If the beams overlap at the viewing plane, optical interference may occur. Therefore, in an embodiment, the first and second spatially modulated light beams do not overlap at the viewing plane.

The two holographic reconstructions are respectively compensated so as each eye sees substantially the same image. If the two images differ, confusion may be caused. In an embodiment, the redirected first spatially modulated light beam has a convergence or divergence substantially equal to that of the redirected second spatially modulated light beam.

The light may be spatially modulated using a spatial light modulator such as a liquid crystal on silicon SLM. It can be understood that the holographic data is written to the SLM such that an incident plane wave of light is spatially modulated with the holographic data. In this respect, it may be considered that the pixels of the SLM "display" or "represent" the holographic data.

In an embodiment, spatial modulation is provided by representing the first and second holographic data on at least one spatial light modulator; and illuminating the at least one spatial light modulator with a plane wave to form the first and second spatially modulated light beams corresponding to the first and second holographic data, respectively.

Advantageous embodiments relate to a head-up display for a vehicle using the vehicle windscreen as an optical element to redirect light to the viewer. In this respect, the windscreen may be considered an optical combiner. That is, in embodiments, the optical element is a vehicle windscreen. However, the skilled person will appreciate that the present disclosure is suitable for compensating for unwanted optical power provided by any optical component.

There is provided a corresponding projector having: processing means arranged to combine Fourier domain data representative of a 2D image with Fourier domain data having a first lensing effect to produce first holographic data; at least one spatial light modulator comprising an array of pixels arranged to represent the first holographic data; an optical element having spatially variant optical power, wherein the optical element comprises a first region having a first optical power; wherein the first lensing effect compensates for the first optical power.

In a further advantageous embodiment: the processing means are further arranged to combine the Fourier domain data representative of the 2D image with Fourier domain data having a second lensing effect to produce second holographic data; the at least one spatial light modulator further comprises an array of pixels arranged to represent the second holographic data; wherein the optical element further comprises a second region having a second optical power; and wherein the second lensing effect compensates for the second optical power.

Embodiments utilise two SLMs to provide the two holographic reconstructions. However, if a sufficiently large SLM existed, the same effect would be possible using a single device with the individual holograms being written only to the area being viewed by the driver. That is, in other embodiments, different areas of the same SLM are used to form the two holographic reconstructions. That is, in an embodiment, the at least one spatial light modulator comprises a first spatial light modulator comprising an array of pixels arranged to represent the first holographic data and a second spatial light modulator comprising an array of pixels arranged to represent the second holographic data.

The skilled person will understand that the light source may be part of the projector or an external component arranged to co-operate with the projector. That is, in an embodiment, the projector further comprises a light source arranged to illuminate the at least one spatial light modulator with a plane wave.

In another embodiment a single light source is split using a beam splitter or other optical splitter and is used to illuminate both spatial light modulators.

It can be understood that a head-up display may display a variety of information as known in the art. Holograms corresponding to all the possible displays may be therefore be pre-calculated and stored in a repository, or calculated in real-time. In an embodiment, the projector further comprises a repository of Fourier domain data representative of a plurality of 2D images. Likewise, in embodiments, there is provided a repository of Fourier domain data having different lensing effects. In further embodiments, a look-up table of the optical power of the optical element as a function of position (e.g. x and y co-ordinates) is provided so that the appropriate lensing data may be applied to compensate for the optical element.

Figure 7:
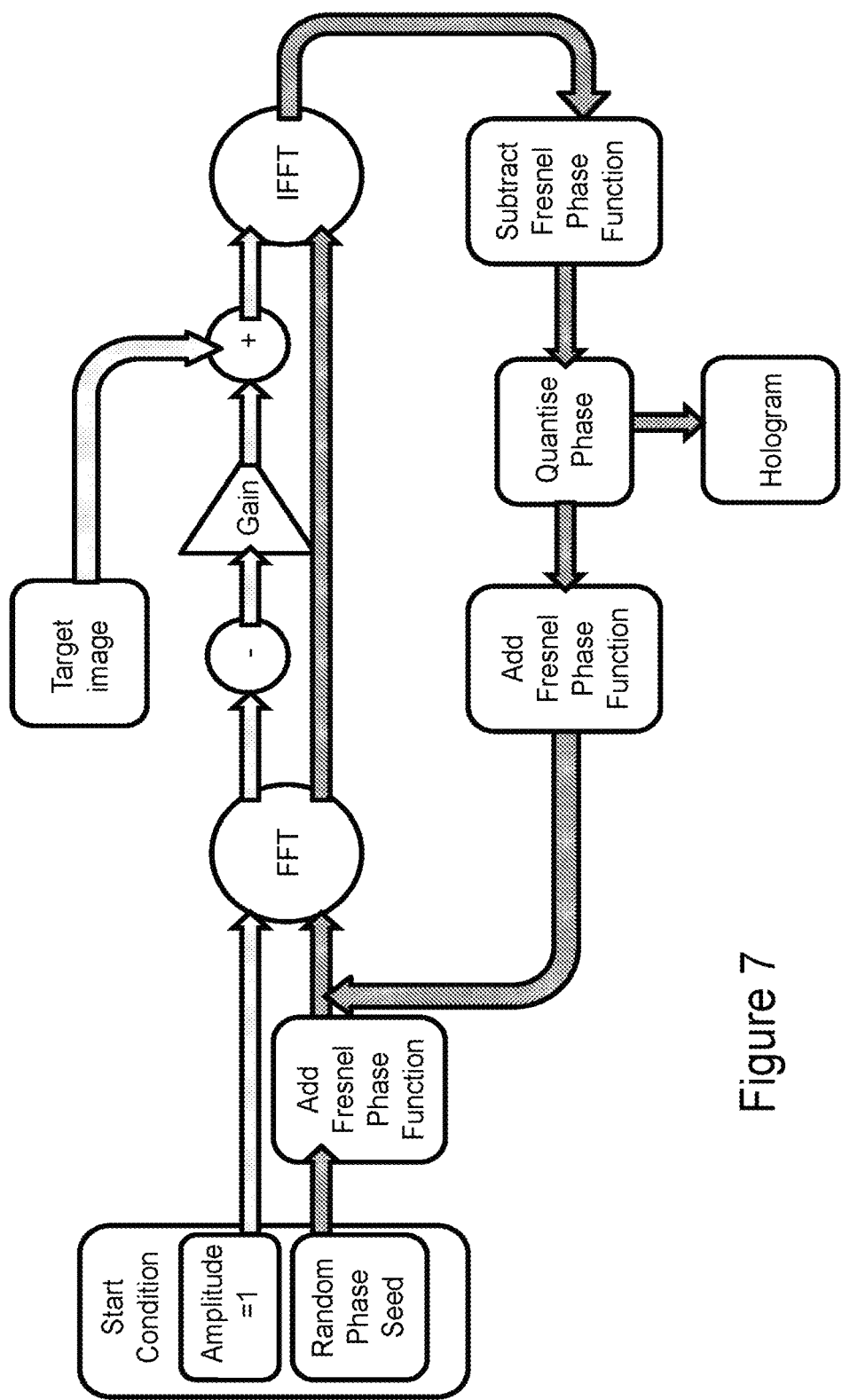
FIG. 7 is an algorithm for calculating a Fresnel hologram in accordance with embodiments.

Embodiments described herein relate to Fourier holography by way of example only. The present disclosure is equally applicable to Fresnel holography in which Fresnel lens functions are applied during calculation of the hologram. FIG. 7 shows an example Fresnel holographic algorithm for calculating the Fourier domain data representative of a target image for projection.

The start condition 701 for the phase retrieval algorithm is that each pixel has unity amplitude but a random phase provided by a random phase seed function. A Fresnel phase function 703 is added to the phase data. The resultant amplitude and phase function is Fourier transformed 705. The target image (amplitude only) 709 is subtracted from the amplitude component and a controllable gain 711 applied. The target image 709 is added to the amplitude component and an inverse Fourier transform 715 performed. The Fresnel lens function 717 is substracted and the phase quantised 719. The resulting phase information forms the hologram 723. A further iteration of the loop may be performed by adding the Fresnel lens function 721 again and repeating the Fourier transform 715 and subsequent steps until an "acceptable" quality hologram is obtained.

The quality of the reconstructed hologram may be affect by the so-called zero order problem which is a consequence of the diffractive nature of the reconstruction. Such zero-order light can be regarded as "noise" and includes for example specularly reflected light, and other unwanted light from the SLM.

This "noise" is generally focussed at the focal point of the Fourier lens, leading to a bright spot at the centre of a reconstructed hologram. Conventionally, the zero order light is simply blocked out however this would clearly mean replacing the bright spot with a dark spot.

However as the hologram contains three dimensional information, it is possible to displace the reconstruction into a different plane in space—see, for example, published PCT application WO 2007/131649 incorporated herein by reference.

Alternatively and angularly selective filter could be used to remove only the collimated rays of the zero order. Other methods of managing the zero order may also be used.

Whilst embodiments described herein relate to displaying one hologram per frame, the present disclosure is by no means limited in this respect and more than one hologram may be displayed on the SLM at any one time.

For example, embodiments implement the technique of "tiling", in which the surface area of the SLM is further divided up into a number of tiles, each of which is set in a phase distribution similar or identical to that of the original tile. Each tile is therefore of a smaller surface area than if the whole allocated area of the SLM were used as one large phase pattern. The smaller the number of frequency component in the tile, the further apart the reconstructed pixels are separated when the image is produced. The image is created within the zeroth diffraction order, and it is preferred that the first and subsequent orders are displaced far enough so as not to overlap with the image and may be blocked by way of a spatial filter.

As mentioned above, the image produced by this method (whether with tiling or without) comprises spots that form image pixels. The higher the number of tiles used, the smaller these spots become. If one takes the example of a Fourier transform of an infinite sine wave, a single frequency is produced. This is the optimum output. In practice, if just one tile is used, this corresponds to an input of a single cycle of a sine wave, with a zero values extending in the positive and negative directions from the end nodes of the sine wave to infinity. Instead of a single frequency being produced from its Fourier transform, the principle frequency component is produced with a series of adjacent frequency components on either side of it.

The use of tiling reduces the magnitude of these adjacent frequency components and as a direct result of this, less interference (constructive or destructive) occurs between adjacent image pixels, thereby improving the image quality.

Preferably, each tile is a whole tile, although it is possible to use fractions of a tile.

Although embodiments relate to variants of the Gerchberg-Saxton algorithm, the skilled person will understand that other phase retrieval algorithms may implement the improved method disclosed herein.

The skilled person will understand that the improved method disclosed herein is equally applicable to the calculation of a hologram used to form a three-dimensional reconstruction of an object.

Equally, the present disclosure is not limited to projection of a monochromatic image.

A colour 2D holographic reconstruction can be produced and there are two main methods of achieving this. One of these methods is known as "frame-sequential colour" (FSC). In an FSC system, three lasers are used (red, green and blue) and each laser is fired in succession at the SLM to produce each frame of the video. The colours are cycled (red, green, blue, red, green, blue, etc.) at a fast enough rate such that a human viewer sees a polychromatic image from a combination of the three lasers. Each hologram is therefore colour specific. For example, in a video at 25 frames per second, the first frame would be produced by firing the red laser for $1/75$th of a second, then the green laser would be fired for $1/75$th of a second, and finally the blue laser would be fired for $1/75$th of a second. The next frame is then produced, starting with the red laser, and so on.

An alternative method, that will be referred to as "spatially separated colours" (SSC) involves all three lasers being fired at the same time, but taking different optical paths, e.g. each using a different SLM, or different area of a single SLM, and then combining to form the colour image.

An advantage of the frame-sequential colour (FSC) method is that the whole SLM is used for each colour. This means that the quality of the three colour images produced will not be compromised because all pixels on the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC (spatially separated colours) method is that the image is brighter due to all three lasers being fired at the same time. However, if due to space limitations it is required to use only one SLM, the surface area of the SLM can be divided into three equal parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced.

In embodiments, the SLM is a Liquid Crystal over silicon (LCOS) device. LCOS SLMs have the advantage that the signal lines, gate lines and transistors are below the mirrored surface, which results in high fill factors (typically greater than 90%) and high resolutions.

LCOS devices are now available with pixels between 4.5 μm and 12 μm.

Figure 8:
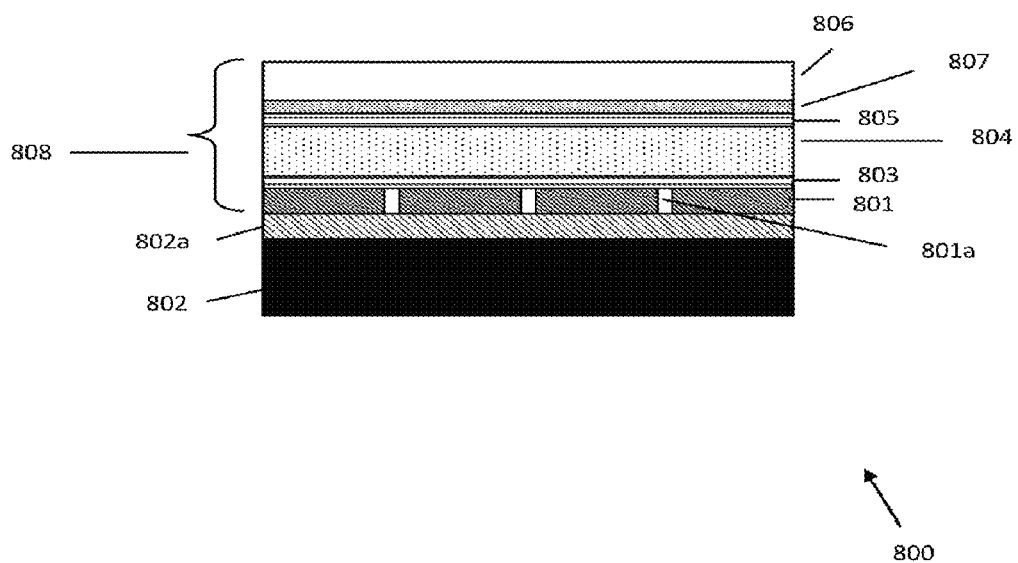
FIG. 8 is a schematic of a LCOS SLM.

The structure of an LCOS device is shown in FIG. 8.

A LCOS device is formed using a single crystal silicon substrate (802). It has a 2D array of square planar aluminium electrodes (801), spaced apart by a gap (801*a*), arranged on the upper surface of the substrate. Each of the electrodes (801) can be addressed via circuitry (802*a*) buried in the substrate (802). Each of the electrodes forms a respective planar mirror. An alignment layer (803) is disposed on the array of electrodes, and a liquid crystal layer (804) is disposed on the alignment layer (803). A second alignment layer (805) is disposed on the liquid crystal layer (404) and a planar transparent layer (806), e.g. of glass, is disposed on the second alignment layer (805). A single transparent electrode (807) e.g. of ITO is disposed between the transparent layer (806) and the second alignment layer (805).

Each of the square electrodes (801) defines, together with the overlying region of the transparent electrode (807) and the intervening liquid crystal material, a controllable phase-modulating element (808), often referred to as a pixel. The effective pixel area, or fill factor, is the percentage of the total pixel which is optically active, taking into account the space between pixels (801*a*). By control of the voltage applied to each electrode (801) with respect to the transparent electrode (807), the properties of the liquid crystal material of the respective phase modulating element may be varied, thereby to provide a variable delay to light incident thereon. The effect is to provide phase-only modulation to the wavefront, i.e. no amplitude effect occurs.

A major advantage of using a reflective LCOS spatial light modulator is that the liquid crystal layer can be half the thickness than would be necessary if a transmissive device were used. This greatly improves the switching speed of the liquid crystal (a key point for projection of moving video images). A LCOS device is also uniquely capable of displaying large arrays of phase only elements in a small aperture. Small elements (typically approximately 10 microns or smaller) result in a practical diffraction angle (a few degrees) so that the optical system does not require a very long optical path.

It is easier to adequately illuminate the small aperture (a few square centimetres) of a LCOS SLM than it would be for the aperture of a larger liquid crystal device. LCOS SLMs also have a large aperture ratio, there being very little dead space between the pixels (as the circuitry to drive them is buried under the mirrors). This is an important issue to lowering the optical noise in the replay field.

The above device typically operates within a temperature range of 10° C. to around 50° C., with the optimum device operating temperature being around 40° C. to 50° C., depending however on the LC composition used.

Using a silicon backplane has the advantage that the pixels are optically flat, which is important for a phase modulating device.

Whilst embodiments relate to a reflective LCOS SLM, the skilled person will understand that any SLM can be used including transmissive SLMs.

The invention is not restricted to the described embodiments but extends to the full scope of the appended claims.

The invention claimed is:

1. A method of projection comprising:
combining Fourier domain data representative of a 2D image with Fourier domain data having a first lensing effect to produce first holographic data; and
providing a first spatially modulated light beam to a first region of a viewing plane by a method comprising
spatially modulating light with the first holographic data to form the first spatially modulated light beam;
redirecting the first spatially modulated light beam using an optical combiner having a first region having a first optical power resulting from a curvature of the combiner in the first region thereof, and a second region having a second optical power resulting from a curvature of the combiner in the second region thereof, the second optical power being different from the first optical power as a result of the curvature in the second region being different than the curvature in the first region, the redirecting being performed by illuminating the first region of the optical combiner with the first spatially modulated beam, the optical combiner redirecting the first spatially modulated light beam to the first region of a viewing plane to provide a first image corresponding to the 2D image at the first region of the viewing plane,
wherein the first lensing effect compensates at the first region of the viewing plane for the first optical power of the first region of the optical combiner.

2. The method of claim 1 wherein the first lensing effect negates at the first region of the viewing plane the first optical power of the first region of the optical combiner.

3. The method of claim 1 wherein spatially modulating light with the first holographic data to form a first spatially modulated light beam comprises:
representing the first holographic data on at least one spatial light modulator; and
illuminating the at least one spatial light modulator with a plane wave to form the first spatially modulated light beam corresponding to the first holographic data.

4. The method of claim 1 wherein the optical combiner is a vehicle windscreen.

5. A method as claimed in claim 1, wherein the spatial modulation is a phase-only modulation.

6. A method as claimed in claim 1, wherein the redirecting of the first spatially modulated light beam is a reflecting of the first spatially modulated light beam.

7. A method as claimed in claim 1, wherein
spatially modulating light with the first holographic data to form a first spatially modulated light beam comprises:
representing the first holographic data on at least one spatial light modulator; and illuminating the at least one spatial light modulator with a plane wave to form the first spatially modulated light beam corresponding to the first holographic data; and
the projection provides a head-up display image visible at the first region of the viewing plane.

8. A method according to claim 1, wherein the redirecting is a reflection.

9. A method as claimed in claim 1, wherein the projection provides a head-up display image visible at the first region of the viewing plane.

10. A method as claimed in claim 9, wherein the head-up display provides an observer at the first region of the viewing plane a view through the optical combiner overlapped with the first image corresponding to the 2D image.

11. A projector comprising:
a computer processor arranged to combine Fourier domain data representative of a 2D image with Fourier domain data having a first lensing effect to produce first holographic data;
one or more spatial light modulators, the one or more spatial light modulators together comprising
a first array of pixels arranged to represent the first holographic data, the first array of pixels of the spatial light modulator being configured to spatially modulate light with the first holographic data to provide a first spatially modulated light beam;
an optical combiner having spatially variant optical power, wherein the optical combiner comprises
a first region having a first optical power resulting from a curvature of the combiner in the first region thereof, and a second region having a second optical power resulting from a curvature of the combiner in the second region thereof, the second optical power being different from the first optical power as a result of the curvature in the second region being different than the curvature in the first region, the optical combiner being configured to be illuminated by the first spatially modulated light beam in the first region thereof and redirect the first spatially modulated light beam to a first region of a viewing plane to provide a first image corresponding to the 2D image at the first region of the viewing plane;
wherein the first lensing effect compensates at the first region of the viewing plane for the first optical power of the first region of the optical combiner.

12. A projector as claimed in claim 11 further comprising a light source arranged to illuminate the at least one spatial light modulator with a plane wave.

13. A projector as claimed in claim 11 further comprising a repository of Fourier domain data representative of a plurality of 2D images, the repository being configured to provide the Fourier domain data to the computer processor.

14. A projector as claimed in claim 11 wherein the optical combiner is a vehicle windscreen.

15. A projector as claimed in claim 11, wherein the spatial light modulator is a phase-only spatial light modulator.

16. A projector as claimed in claim 11, wherein the projector is configured to provide a head-up display at the first region of the viewing plane.

17. A projector as claimed in claim 11, wherein the projector is configured to provide an observer at the first region of the viewing plane a view through the optical combiner overlapped with the first image corresponding to the 2D image.

18. A projector as claimed in claim 11, wherein the optical combiner is configured to reflect the first spatially modulated light beam.

19. A vehicle comprising the projector as claimed in claim 11, wherein the optical combiner is a windscreen of the vehicle.

* * * * *